Feb. 19, 1963  W. HENNY ET AL  3,078,071
OUTER SHROUD FOR GAS TURBINE ENGINE
Filed Sept. 28, 1960

INVENTORS.
Willi Henny.
Giovanni F. Savonuzzi.
BY
Harness & Harris
ATTORNEYS

United States Patent Office 3,078,071
Patented Feb. 19, 1963

3,078,071
OUTER SHROUD FOR GAS TURBINE ENGINE
Willi Henny, Southfield, and Giovanni F. Savonuzzi, Birmingham, Mich., assignors to Chrysler Corporation, Highland Park, Mich., a corporation of Delaware
Filed Sept. 28, 1960, Ser. No. 59,101
15 Claims. (Cl. 253—39)

This invention relates to gas turbine engines and in particular to improvements in the construction and means for supporting the gas passage which conducts hot motive gases to the turbine rotors.

In one type of automotive gas turbine engine, a pair of axially spaced coaxial rotors are supported in separate fixed rotor supports. A gas passage comprising annular inner and outer shroud sections conveys hot motive gases to the rotors to drive the same, the first rotor being employed to drive a compressor for supplying combustion supporting air to the engine, and the second rotor being connected with driving wheels to propel the engine. Because of asymmetry in the engine and the different coefficients of thermal expansion of its components, a limited amount of thermal distortion and relative movement between otherwise fixed engine parts is unavoidable. Such relative movement between the separate rotor supports frequently causes the axes of the two rotors to deviate from their coaxial alignment during operation of the engine. In consequence, particular difficulty has been encountered in the provision of simple means for supporting the shroud sections between the two rotor supports while at the same time accommodating limited axial misalignment between the two rotor supports resulting from unavoidable thermal distortion during operation.

An object of the present invention is to provide improvements in a gas turbine engine which overcome the above problems and which provide simple yet highly effective and economical means for adjustably supporting the annular gas passage walls between the turbine rotors.

Another and more specific object is to provide a gas turbine engine of the above character comprising a pair of separate fixed rotor supports having a corresponding pair of axially spaced rotors journalled coaxially thereon. Each rotor support carries a set of circumferentially arranged shroud supports slidably engaging the inner surface of an outer annular shroud section at locations adjacent and spaced by said rotors. The annular shroud section is also provided with a coaxial annular outer supporting surface comprising a spherical zone having a center of curvature on the shroud axis and having a radius conveniently larger than the radius of the shroud section at the region of said spherical zone. The supporting surface of the shroud section is supported by sliding engagement with the surface of a mating coaxial spherical zone of an annular member having also a plane coaxial annular surface perpendicular to the axis of said shroud and supported by sliding engagement with a parallel mating annular surface of a fixed portion of the engine. Thus the annular member is susceptible of both radial shifting and angular cocking to enable limited adjustment of said rotor supports and shroud with respect to each other.

Another object is to provide such a structure wherein the set of shroud supports carried by one of the rotor supports comprises a set of fixed nozzles arranged circumferentially within the annular gas passage upstream of the compressor driving rotor.

Another object is to provide a structure of the above character wherein the inner shroud section of the annular gas passage between the two rotors is supported in fixed relationship with respect to the outer shroud section by the radially inner ends of a plurality of adjustable nozzles arranged circumferentially within said annular gas passage upstream of said second or propulsion rotor.

Other objects of this invention will appear in the following description and appended claims, reference being had to the accompanying drawings forming a part of this specification wherein like reference characters designate corresponding parts in the several views.

Figure 1:
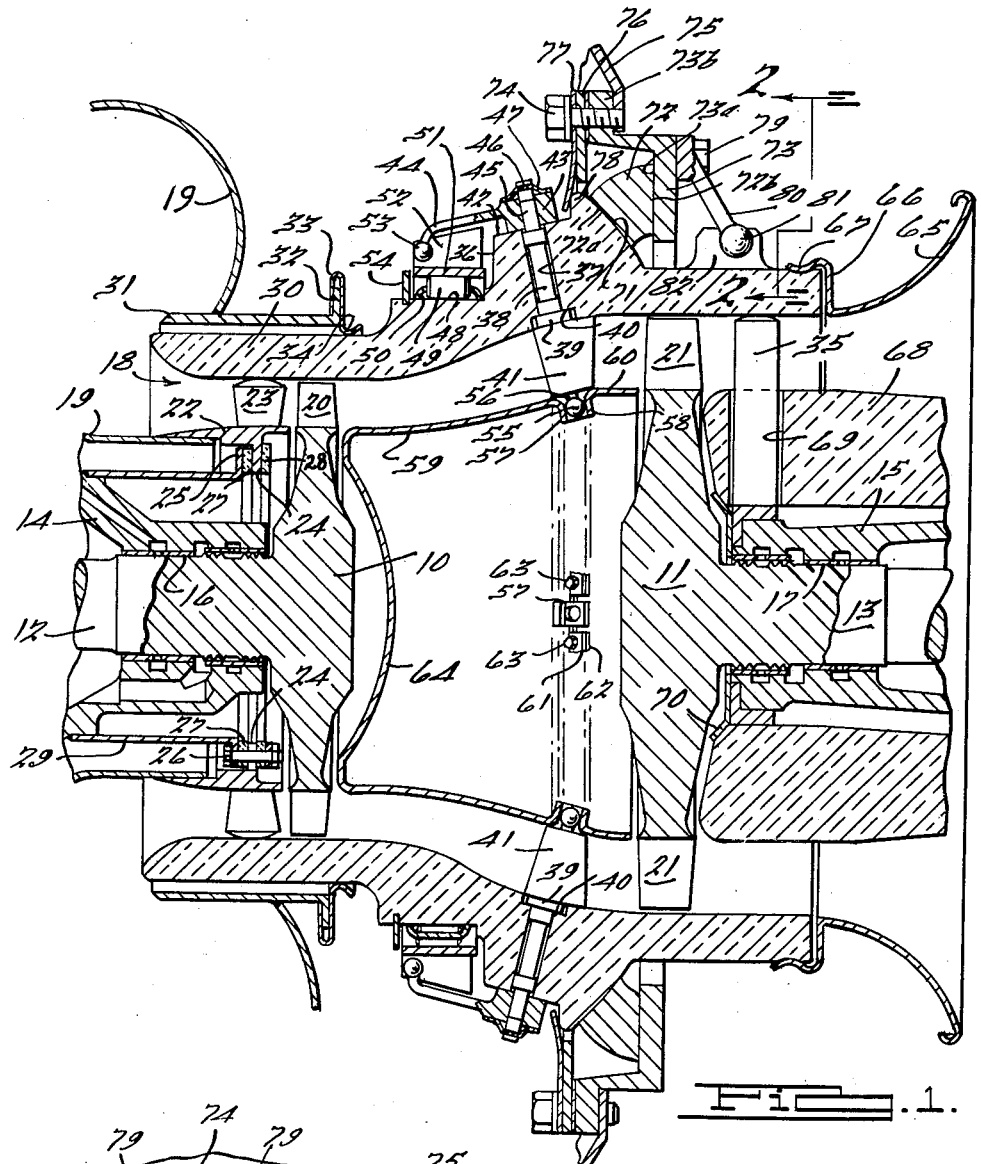
FIGURE 1 is a fragmentary mid-sectional view through the rotors of a gas turbine engine embodying the present invention.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a particular embodiment of the present invention is illustrated by way of example comprising a gas turbine engine suitable for automotive use having coaxial rotors 10 and 11 secured to separate shafts 12 and 13 respectively, journalled in separate supports 14 and 15 suitably secured to fixed portions of the vehicle engine. Bearings 16 and 17 carried by the supports 14 and 15 rotatably support the shafts 12 and 13. The latter shaft may be suitably connected through a speed reduction gearing to the driving wheels of the vehicle, whereas the shaft 12 is suitably connected with an air compressor for supplying combustion supporting air to the engine.

Air from the compressor is discharged to a combustion chamber where fuel is added and burned in accordance with customary practice, the combustion products being then discharged into a spiral collecting chamber of which a fragmentary annular portion of its inner wall 19 is illustrated. From the collecting chamber the hot motive gases are discharged into an annular gas passage 18 to the peripheral blades 20 and 21 of the rotors 10 and 11 respectively, and thence to an exhaust chamber.

The annular gas passage 18 comprises a number of inner and outer shroud sections. One of the inner shroud sections comprises a plurality of circumferentially extending shroud segments 22 having their leftward axially extending edges closely overlying the juxtaposed annular wall portion 19 and having their rightward axial edges terminating adjacent the rotor 10 at the base of the blades 20. Each of the shroud segments 22 carries a plurality of circumferentially spaced radially extending fixed flow directing nozzles 23 arranged immediately upstream of the blades 20. Extending radially inwardly from each shroud segment 22 are one or more integral stems 24 clamped to an annular nozzle supporting flange 25 by a plurality of bolt and nut assemblies 26. Preferably, in order to minimize heat transfer from the stems 24 to the flange 25, the bolt and nut assemblies 26 are arranged between adjacent circumferentially spaced stems 24. Also heat insulating gaskets 27 and 28 are interposed between the stems 24 and juxtaposed portions of support 25 and the nuts of the assemblies 26 respectively. The support 25 comprises an integral flange of a tubular heat dissipating body 29 which extends coaxially around the shaft 12 and is suitably secured to the support 14 at a location spaced axially from the stems 24.

Extending closely around the outer peripheries of the blades 20 and 21 is an annular outer shroud section 30 which may be formed of ceramic or other material having a comparatively low coefficient of thermal expansion. The left end of shroud 30 is supported by sliding contact with the rounded outer ends of the nozzles 23 which are preferably formed spherically about a radius approximately equal to the radius of the inner surface of the outer shroud 30 at its region of contact with the blades 23.

Around the outer periphery of the left end of shroud 30 and spaced radially therefrom is a sleeve 31 which is suitably secured to a fixed portion of the engine, as for example a continuation of the wall 19 of the aforesaid spiral collecting chamber. The right end of sleeve 31 terminates in a radial flange 32 confined within an annular channel seal 33 having an annular rounded out-turned portion 34 resiliently engaging the outer surface of shroud 30 in fluid sealing relation. The right end of shroud 30 is supported by sliding contact with the rounded radially outer ends of a plurality of circumferentially spaced fixed struts 35 suitably secured to support 15. Similarly to the outer ends of the nozzles 23, the outer ends of the struts 35 are formed spherically about a radius approximately equal to the radius of the inner surface of shroud 30 at its region of contact with the struts 35.

An intermediate thickened annular portion 36 of the shroud 30 is provided with a plurality of circumferentially spaced bores 37 for a corresponding plurality of spindles 38 having their axes contained in a conical envelope perpendicular to the adjacent inner surface of shroud 30. Each spindle 38 is journalled within its bore 37 for pivotal movement about its generally radial axis and is provided with an integral annular sealing enlargement 39 at its lower end abutting an annular seat or shoulder 40 of the shroud 30 around the bore 37. Secured to the inner end of each spindle 38 within the passage 18 and in advance of the rotor blades 21 is an adjustable nozzle blade 41 pivotally adjustable about the axis of the spindle 38 upon pivoting of the latter.

The outer surface of the enlargement 36 around each bore 37 comprises a plane annular seat 42 for the hub 43 of a swinging arm 44. Each hub 43 is splined to an upper extension 45 of the associated spindle 38 to pivot therewith and is resiliently maintained in position by means of a C-shaped Belleville type washer 47 confined within a reduced neck portion 46 of the spindle 38 above the hub 43. Each washer 47 is under spring tension yieldingly urging the hub 43 against its seat 42 and yieldingly urging the spindle 38 outwardly so as to seat the spindle enlargement 39 in fluid sealing engagement with the annular seat 40.

Adjacent and axially leftward of the enlargement 36, the shroud 30 is provided with a cylindrical platform 48 for a few circumferentially spaced rollers 49 maintained in their circumferentially spaced relationship by an annular bearing race 50. A ring 51 is rotatably mounted on the rollers 49 and carries a plurality of pairs of circumferentially spaced plates 52. The plates 52 of each pair extend parallel to each other to provide an axial and radially outwardly opening slot having the ball end 53 of one of each of the swinging arms 44 snugly confined therein, so that upon rotation of ring 51, all of the swinging arms 44 and associated spindles 38 and adjustable nozzle blades 41 will be pivoted in unison about the axes of the associated spindles.

Extending coaxially with each spindle 38 and spaced from the radial inner edge of the associated blade 41 by a neck 56 is a shroud supporting ball element 55 resiliently clamped between a pair of mating flanges 57 and 58 of intermediate inner annular shroud sections 59 and 60 respectively. A plurality of pairs of flanges 57 and 58 are spaced circumferentially around the axis of the rotors 10 and 11, each pair being associated with one of each of the ball elements 55 and extending generally in parallelism with the axis of the associated spindle 38. Also extending radially inwardly from the shroud sections 59 and 60 respectively are a plurality of circumferentially spaced pairs of flanges 61 and 62 clamped together by bolt and nut assemblies 63. The paired flanges 61 and 62 are spaced circumferentially by the spherical elements 55 and preferably alternate with the paired flanges 57 and 58, the flanges 57 and 61 being integral with the shroud section 59, and the flanges 58 and 62 being integral with the shroud section 60.

By the structure thus described, the inner shroud sections 59 and 60 are secured together and are firmly held in spaced relationship with respect to the outer shroud 30. The shroud section 59 extends axially leftward to adjacent the rotor 10 at the base of the latter's blades 20 and comprises the annular wall of a cup-shaped member having an integral base 64 which provides a baffle to prevent axial flow of the motive gases through the interior of the shroud section 59. The shroud section 60 extends axially to the right and terminates adjacent the rotor 11 at the base of the blades 21.

The outer shroud 30 may extend annularly to the end of the gas passage 18, but preferably terminates as illustrated, immediately to the right of the struts 35 to facilitate construction and assembly of the parts described below. An outer sheet metal terminal annular shroud section 65 is provided with a radial flange 66 abutting the adjacent right end of shroud section 30 and terminates in an annular rounded flange portion 67 recessed slightly into the outer surface of shroud 30 and resiliently engaging the latter entirely around its circumference. Extending from adjacent the right face of rotor 11 at the base of the blades 21 is an inner annular shroud section 68 having radial openings 69 for passage of the struts 35 freely therethrough and supported at its leftward edge by a fixed conical disc 70, which in turn is suitably secured to support 15. Reference may be had to copending applications of applicants' assignee, Serial No. 40,951 filed July 5, 1960 (now Patent No. 3,038,697) and Serial No. 34,172 filed June 6, 1960 for further details of the structure described thus far.

In order to facilitate assembly of the structure described and to accommodate limited displacement of the supports 14 and 15 from their coaxial alignment, the thickened portion 36 of shroud 30 is provided with a spherical surface 71 comprising an annular zone coaxial with the shroud 30. An annular adjustment member 72 having a spherical zonal surface 72a mating concentrically with the surface 71 and slidably engaging the latter is also provided with an annular surface 72b coaxial with the surface 72a and extending generally perpendicularly to the axis of the rotor 11. The member 72 is supported between the surface 71 and the annular surface 73a of an annular bracket 73 of L-shaped section. In its centered position, the surface 73a extends perpendicularly to the axis of the rotors 10 and 11 and is provided on the radially inwardly projecting annular flange of the bracket 73 which is coaxial with the latter axis. The radially outwardly extending annular flange 73b of bracket member 73 is secured by a plurality of bolts 74 to a fixed bulkhead 75 of the engine frame. An annular backup plate 76 and spring seal 77 are also secured to the flange 73b, the radially inner portion of seal 77 resiliently engaging an annular projection 78 of shroud 30 in fluid sealing relation tending to urge shroud 30 and its surface 71 toward the mating spherical surface of the adjustment member 72.

It is apparent that limited radial shifting of either support 14 or 15 with respect to the other will result in a corresponding cocking of the shroud 30 on the spherical outer ends of the supports 23 and 35. This movement is permitted and accompanied by a corresponding sliding movement between the spherical surfaces 71 and 72a and between the parallel radial surfaces 72b and 73a. In this regard, the median tangent of surface 71 meets the axis of shroud 30 at approximately a 45° angle so as to achieve a moderate compromise in the extent of adjustment movements of the surfaces 71 and 73a with respect to their mating surfaces 72a and 72b.

Figure 2:
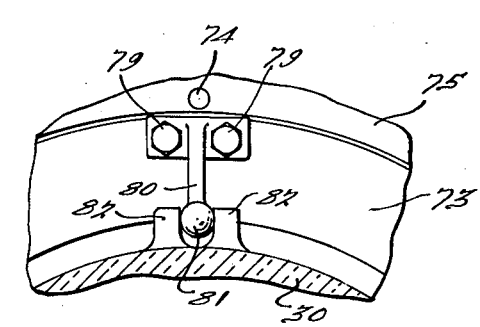
FIGURE 2 is a fragmentary elevational view taken in the direction of the arrows substantially along the line 2—2 of FIGURE 1.

In order to resist rotational thrust on the shroud 30 resulting from the impact of the motive gases against the nozzle blades 41, a bracket arm 80 is secured by a pair of bolts 79, FIGURE 2, to the bracket 73. The arm 80 extends radially toward shroud 30 and terminates in a ball portion 81 confined between a pair of parallel bosses 82 integral with the shroud section 30. The confronting surfaces of the bosses 82 snugly engage the ball 81 and extend parallel to a plane containing the axes of shroud 30 and of arm 80 when these are in their centered positions. As illustrated in FIGURE 2, the ball portion 81 is spaced radially from the body of the shroud 30 so as to enable limited radial and axial movement of the latter, resulting from thermal distortion affecting the axial alignment of the supports 14 and 15, but prevents rotational movement of the shroud 30 about its axis.

We claim:

1. In a gas turbine engine, a supporting frame, a rotor mounted thereon, gas passage means for conducting hot motive gases to said rotor to drive the same, an annular shroud around said rotor and defining an outer wall portion of said passage means, supporting means in sliding engagement with the interior surface of said shroud, said shroud having an annular outer supporting surface around the axis of said shroud and comprising a spherical zone having a center of curvature on the axis of said shroud, the radius of said spherical zone being greater than the radius of said shroud at the region of said zone, and annular means supported by said frame and having a spherical zone mating with and slidably engaging the first named spherical zone to enable limited angular shifting of said shroud with respect to said rotor.

2. In a gas turbine engine, a supporting frame, a rotor mounted thereon, gas passage means for conducting hot motive gases to said rotor to drive the same, an annular shroud around said rotor and defining an outer wall portion of said passage means, supporting means in sliding engagement with the interior surface of said shroud, said shroud having an annular outer supporting surface around the axis of said shroud and comprising a spherical zone having a center of curvature on the axis of said shroud, the radius of said spherical zone extending from midway between the latter's boundaries meeting said axis at approximately a 45° angle, and annular means supported by said frame and having a spherical zone mating with and slidably engaging the first named spherical zone to enable limited angular shifting of said shroud with respect to said rotor.

3. In a gas turbine engine, a supporting frame, a rotor mounted thereon, gas passage means for conducting hot motive gases to said rotor to drive the same, an annular shroud around said rotor and defining an outer wall portion of said passage means, supporting means in sliding engagement with the interior surface of said shroud, said shroud having an annular outer supporting surface around the axis of said shroud and comprising a spherical zone having a center of curvature on the axis of said shroud, the radius of said spherical zone being greater than the radius of said shroud at the region of said zone, annular means supported by said frame and having a spherical zone mating with and slidably engaging the first named spherical zone to enable limited angular shifting of said shroud with respect to said rotor, and means yieldingly urging said shroud axially in the direction to maintain the surfaces of the two spherical zones in sliding engagement with each other.

4. In a gas turbine engine, a supporting frame, a rotor mounted thereon, gas passage means for conducting hot motive gases to said rotor to drive the same, an annular shroud around said rotor and defining an outer wall portion of said passage means, supporting means in sliding engagement with the interior surface of said shroud, said shroud having an annular outer supporting surface around the axis of said shroud and comprising a spherical zone having a center of curvature on the axis of said shroud, the radius of said spherical zone being greater than the radius of said shroud at the region of said zone, annular means supported by said frame and having a spherical zone mating with and slidably engaging the first named spherical zone to enable limited angular shifting of said shroud with respect to said rotor, and means to restrict rotational movement of said shroud around its axis with respect to said frame comprising an axially extending slot in one of the members comprising said shroud and frame, the last named means also including a projection of the other of said members having a rounded end closely confined between the sidewalls of said slot in radially and axially sliding engagement, said sidewalls being parallel to a plane containing the axis of said shroud.

5. In a gas turbine engine, a supporting frame, a rotor mounted thereon, gas passage means for conducting hot motive gases to said rotor to drive the same, an annular shroud around said rotor and defining an outer wall portion of said passage means, supporting means in sliding engagement with the interior surface of said shroud, said shroud having an annular outer supporting surface around the axis of said shroud and comprising a spherical zone having a center of curvature on the axis of said shroud, the radius of said spherical zone being greater than the radius of said shroud at the region of said zone, annular means having a spherical zone mating with and slidably engaging the first named spherical zone to enable limited angular shifting of said shroud with respect to said rotor and also having an annular surface extending around the axis of said shroud perpendicularly thereto and slidably engaging a parallel annular surface of said frame to enable limited radial shifting of said annular means with respect to said frame.

6. In a gas turbine engine, a supporting frame, a rotor mounted thereon, gas passage means for conducting hot motive gases to said rotor to drive the same, an annular shroud around said rotor and defining an outer wall portion of said passage means, supporting means in sliding engagement with the interior surface of said shroud, said shroud having an annular outer supporting surface around the axis of said shroud and comprising a spherical zone having a center of curvature on the axis of said shroud, the radius of said spherical zone extending from midway between the latter's boundaries meeting said axis at approximately a 45° angle, annular means having a spherical zone mating with and slidably engaging the first named spherical zone to enable limited angular shifting of said shroud with respect to said rotor and also having an annular surface extending around the axis of said shroud perpendicularly thereto and slidably engaging a parallel annular surface of said frame to enable limited radial shifting of said annular means with respect to said frame.

7. In a gas turbine engine, a supporting frame, a rotor mounted thereon, gas passage means for conducting hot motive gases to said rotor to drive the same, an annular shroud around said rotor and defining an outer wall portion of said passage means, supporting means in sliding engagement with the interior surface of said shroud, said shroud having an annular outer supporting surface around the axis of said shroud and comprising a spherical zone having a center of curvature on the axis of said shroud, the radius of said spherical zone extending from midway between the latter's boundaries meeting said axis at approximately a 45° angle, annular means having a spherical zone mating with and slidably engaging the first named spherical zone to enable limited angular shifting of said shroud with respect to said rotor and also having an annular surface extending around the axis of said shroud perpendicularly thereto and slidably engaging a parallel annular surface of said frame to enable limited radial shifting of said annular means with respect to said frame, and means yieldingly urging said shroud axially in the direction to maintain the surfaces of the two spherical zones in sliding engagement with each other.

8. In a gas turbine engine, a supporting frame, a rotor mounted thereon, gas passage means for conducting hot motive gases to said rotor to drive the same, an annular shroud around said rotor and defining an outer wall portion of said passage means, supporting means in sliding engagement with the interior surface of said shroud, said shroud having an annular outer supporting surface around the axis of said shroud and comprising a spherical zone having a center of curvature on the axis of said shroud, the radius of said spherical zone being greater than the radius of said shroud at the region of said zone, annular means having a spherical zone mating with and slidably engaging the first named spherical zone to enable limited angular shifting of said shroud with respect to said rotor and also having an annular surface extending around the axis of said shroud perpendicularly thereto and slidably engaging a parallel annular surface of said frame to enable limited radial shifting of said annular means with respect to said frame, and resilient means yieldingly urging said shroud axially in the direction to maintain the surfaces of the two spherical zones in sliding engagement with each other.

9. In a gas turbine engine, a supporting frame including a pair of separate rotor supports, a pair of generally axially spaced coaxial rotors journalled in said supports respectively, gas passage means for conducting hot motive gases to said rotors to drive the same, an annular shroud around said rotors and spanning the axial space therebetween and defining an outer wall portion of said passage means, two sets of circumferentially arranged shroud supports extending from said pair of rotor supports respectively and slidably engaging the interior surface of said shroud in supporting relation at locations adjacent and spaced axially by said rotors, said shroud having an annular outer supporting surface around the axis of said shroud and comprising a spherical zone having a center of curvature on the axis of said shroud, the radius of said spherical zone being greater than the radius of said shroud at the region of said zone, annular means having a spherical zone mating with and slidably engaging the first-named spherical zone to enable limited angular shifting of said shroud with respect to said rotors, and also having an annular surface extending around the axis of said shroud perpendicularly thereto and slidably engaging a parallel annular surface of said frame to enable limited radial shifting of said annular means with respect to said frame.

10. In a gas turbine engine, a supporting frame including a pair of separate rotor supports, a pair of generally axially spaced coaxial rotors journalled in said supports respectively, gas passage means for conducting hot motive gases to said rotors to drive the same, an annular shroud around said rotors and spanning the axial space therebetween and defining an outer wall portion of said passage means, two sets of circumferentially arranged shroud supports extending from said pair of rotor supports respectively and slidably engaging the interior surface of said shroud in supporting relation at locations adjacent and spaced axially by said rotors, said shroud having an annular outer supporting surface around the axis of said shroud and comprising a spherical zone having a center of curvature on the axis of said shroud, the radius of said spherical zone extending from midway between the latter's boundaries meeting said axis at approximately a 45° angle, annular means having a spherical zone mating with and slidably engaging the first-named spherical zone to enable limited angular shifting of said shroud with respect to said rotors, and also having an annular surface extending around the axis of said shroud perpendicularly thereto and slidably engaging a parallel annular surface of said frame to enable limited radial shifting of said annular means with respect to said frame.

11. In a gas turbine engine, a supporting frame including a pair of separate rotor supports, a pair of generally axially spaced coaxial rotors journalled in said supports respectively, gas passage means for conducting hot motive gases to said rotors to drive the same, an annular shroud around said rotors and spanning the axial space therebetween and defining an outer wall portion of said passage means, two sets of circumferentially arranged shroud supports extending from said pair of rotor supports respectively and slidably engaging the interior surface of said shroud in supporting relation at locations adjacent and spaced axially by said rotors, said shroud having an annular outer supporting surface around the axis of said shroud and comprising a spherical zone having a center of curvature on the axis of said shroud, the radius of said spherical zone extending from midway between the latter's boundaries meeting said axis at approximately a 45° angle, annular means having a spherical zone mating with and slidably engaging the first-named spherical zone to enable limited angular shifting of said shroud with respect to said rotors, and also having an annular surface extending around the axis of said shroud perpendicularly thereto and slidably engaging a parallel annular surface of said frame to enable limited radial shifting of said annular means with respect to said frame, and resilient means carried by said frame yieldingly urging said shroud axially in the direction to maintain the surfaces of the two spherical zones in sliding engagement with each other.

12. In a gas turbine engine, a supporting frame including a pair of separate rotor supports, a pair of generally axially spaced coaxial rotors journalled in said supports respectively, gas passage means for conducting hot motive gases to said rotors to drive the same, an annular shroud around said rotors and spanning the axial space therebetween and defining an outer wall portion of said passage means, two sets of circumferentially arranged shroud supports extending from said pair of rotor supports respectively and slidably engaging the interior surface of said shroud in supporting relation at locations adjacent and spaced axially by said rotors, said shroud having an annular outer supporting surface around the axis of said shroud and comprising a spherical zone having a center of curvature on the axis of said shroud, the radius of said spherical zone being greater than the radius of said shroud at the region of said zone, annular means having a spherical zone mating with and slidably engaging the first-named spherical zone to enable limited angular shifting of said shroud with respect to said rotors and also having an annular surface extending around the axis of said shroud perpendicularly thereto and slidably engaging a parallel annular surface of said frame to enable limited radial shifting of said annular means with respect to said frame, and resilient means carried by said frame yieldingly urging said shroud axially in the direction to maintain the surfaces of the two spherical zones in sliding engagement with each other.

13. In a gas turbine engine, a supporting frame including a pair of separate rotor supports, a pair of generally axially spaced coaxial rotors journalled in said supports respectively, gas passage means for conducting hot motive gases to said rotors to drive the same, an annular shroud around said rotors and spanning the axial space therebetween and defining an outer wall portion of said passage means, two sets of circumferentially arranged shroud supports extending from said pair of rotor supports respectively and slidably engaging the interior surface of said shroud in supporting relation at locations adjacent and spaced axially by said rotors, said shroud having an annular outer supporting surface around the axis of said shroud and comprising a spherical zone having a center of curvature on the axis of said shroud, the radius of said spherical zone being greater than the radius of said shroud at the region of said zone, annular means having a spherical zone mating with and slidably engaging the first-named spherical zone to enable limited angular shifting of said shroud with respect to said rotors and also having an annular surface extending around the axis of said shroud perpendicularly thereto and slidably engaging a parallel annular surface of said frame to enable limited radial shifting of said annular means with respect to said frame, and means to restrict rotational movement of said shroud around its axis with respect to said frame comprising an axially extending slot in one of the members comprising said shroud and frame, the last named means also including a projection of the other of said members having an end closely confined between the sidewalls of said slot in radially and axially sliding engagement, said sidewalls being parallel to a plane containing the axis of said shroud.

14. In a gas turbine engine, a supporting frame including a pair of separate rotor supports, a pair of generally axially spaced coaxial rotors journalled in said supports respectively, gas passage means for conducting hot motive gases to said rotors to drive the same, an annular shroud around said rotors and spanning the axial space therebetween and defining an outer wall portion of said passage means, two sets of circumferentially arranged shroud supports extending from said pair of rotor supports respectively and slidably engaging the interior surface of said shroud in supporting relation at locations adjacent and spaced axially by said rotors, said shroud having an annular outer supporting surface around the axis of said shroud and comprising a spherical zone having a center of curvature on the axis of said shroud, the radius of said spherical zone extending from midway between the latter's boundaries meeting said axis at approximately a 45° angle, annular means having a spherical zone mating with and slidably engaging the first-named spherical zone to enable limited angular shifting of said shroud with respect to said rotors and also having an annular surface extending around the axis of said shroud perpendicularly thereto and slidably engaging a parallel annular surface of said frame to enable limited radial shifting of said annular means with respect to said frame, and resilient means carried by said frame yieldingly urging said shroud axially in the direction to maintain the surfaces of the two spherical zones in sliding engagement with each other, and means to restrict rotational movement of said shroud around its axis with respect to said frame comprising an axially extending slot in one of the members comprising said shroud and frame, the last named means also including a projection of the other of said members having an end closely confined between the sidewalls of said slot in radially and axially sliding engagement, said sidewalls being parallel to a plane containing the axis of said shroud.

15. The combination according to claim 14 wherein the outer end of each shroud support in said two sets of shroud supports is formed spherically about a radius at right angles to the axis of the said rotors.

References Cited in the file of this patent

UNITED STATES PATENTS

| 2,429,936 | Kenny et al. | Oct. 28, 1947 |
| 2,628,067 | Lombard et al. | Feb. 10, 1953 |

FOREIGN PATENTS

| 589,919 | France | Mar. 6, 1925 |